Oct. 30, 1962 C. A. REED 3,061,279
APPARATUS FOR PROCESSING FROZEN COMESTIBLES
Filed Feb. 13, 1959 3 Sheets-Sheet 1

INVENTOR.
Claude A. Reed
BY
ATTORNEY.

Oct. 30, 1962

C. A. REED 3,061,279

APPARATUS FOR PROCESSING FROZEN COMESTIBLES

Filed Feb. 13, 1959

INVENTOR.
Claude A. Reed
BY
ATTORNEY.

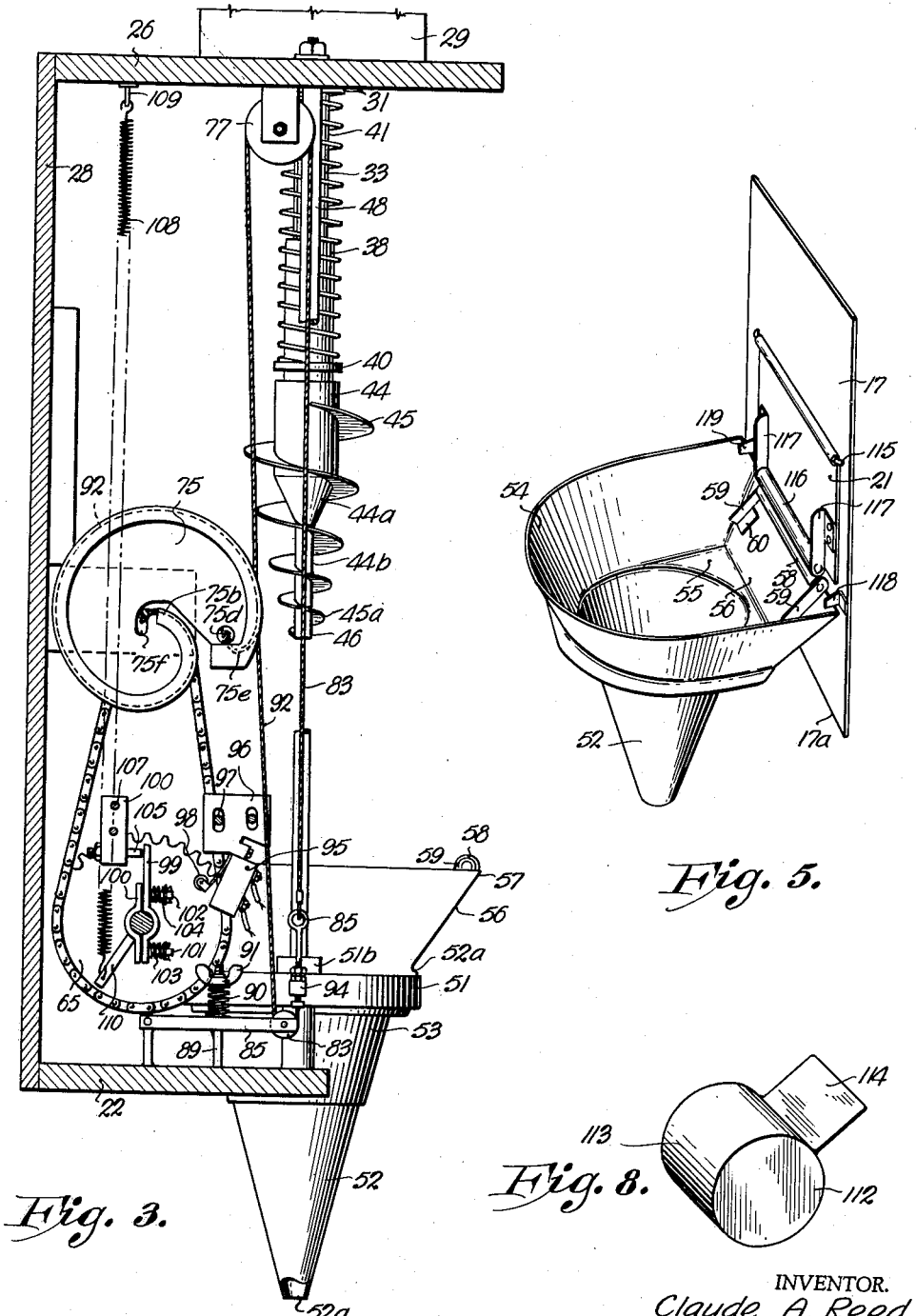

United States Patent Office 3,061,279
Patented Oct. 30, 1962

3,061,279
APPARATUS FOR PROCESSING FROZEN
COMESTIBLES
Claude A. Reed, % Whirla-Whip Inc.,
1507 W.O.W. Bldg., Omaha, Nebr.
Filed Feb. 13, 1959, Ser. No. 793,109
27 Claims. (Cl. 259—2)

This invention relates to apparatus for processing semi-solid frozen comestibles with a view to providing an improved confection and refers more particularly to such apparatus which is adapted to transform a hard frozen ice cream to a product equal to or superior to the fresh frozen product.

This application and invention is an improvement over my Patent No. 2,626,133, "Apparatus for Processing Frozen Comestibles" issued January 20, 1953, and my Patent No. 2,626,132, "Mixing Device for Frozen Comestibles" issued January 20, 1953.

In the above Patent 2,626,133, the desirability of transforming a hard frozen ice cream product (the hard freezing necessary for distribution from a central plant to dealers and consumers or for storage purposes) to a product for consumption more closely resembling the soft, smooth, creamy and palatable condition of the fresh frozen product was fully set forth. Also, in Patent No. 2,626,133, an apparatus was described and disclosed which would accomplish such purpose. Thus, apparatus was provided for pressurizing a hard, frozen comestible similar to hardened ice cream, while simultaneously subjecting it to mechanical action which plasticized, kneaded and vigorously remixed the hard frozen product, thus reducing the crystal and cell structure of the material so that, upon release of the pressure, the product was very soft, smooth and creamy, yet only slightly less cold than the starting material.

However, certain particular deficiencies in the apparatus of my above patents and problems in the operation thereof, have motivated the development of a modified apparatus, which is described below. One major problem arises, when agitating and extruding a frozen comestible as set forth in the above patents, in that often ice cream was extruded from the plasticizing vessel before it was completely and properly treated or processed. Secondly, it became desirable to provide means for moving the plasticizing cup or vessel containing the hard frozen comestible to be treated to the conditioning auger in such a manner that swift movement took place before the auger contacted the comestible, with relatively small application of force to the vessel to move it, while slower movement later took place with greater application of force to the vessel when the auger was working the frozen confection. Another desirable feature lay in the necessity for providing means for turning on and off the auger driving motor at different positions of the comestible containing vessel relative the auger. Thus, it was desirable to start rotating the auger immediately before or slightly after it contacted the frozen confection to be treated and, then, stop the auger rotation immediately after the vessel began motion away therefrom. It was also found desirable to provide a means for normally completely enclosing the operating parts of the mechanism with but a minimum exposure of the mechanism when processing the comestible for sanitary reasons and for simplicity of operation by the operator. It was additionally desired that means be provided for inserting the frozen confection or ice cream to be processed within the treating hopper or vessel without any manual contact by the operator with the ice cream. Finally, the original apparatus was slow in that the discharge orifices of the comestible-containing cup were not quickly cleared for discharge of the whipped comestible and thus the upper portion of the comestible charge was often overwhipped and oversoftened.

Therefore, an object of the instant invention is to provide auger means for plasticizing, kneading and remixing hardened frozen comestibles in an extrusion vessel which also acts to extrude the ice cream therefrom but only after thorough conditioning thereof.

Another object of the invention is to provide auger means for both conditioning ice cream and extruding it from a vessel which automatically delays its extrusion action on at least substantially all of the ice cream in the vessel until it is properly conditioned.

Another object of the invention is to provide auger means cooperating with a processing and discharging cup wherein the auger immediately clears the cup discharge orifices for processed comestible extrusion.

Another object of the invention is to provide auger means for conditioning in and extruding the ice cream from a receiving vessel which automatically adjusts the ratio of conditioning to extrusion in the vessel to the condition of hardness of the ice cream.

Yet another object of the invention is to provide means for raising a frozen comestible containing vessel to and into operative engagement with an ice cream conditioning and extruding auger which automatically varies the rate of approach of the vessel to the auger and amount of force applied to the vessel by the operator according to the relative resistance to be encountered in the stages of the conditioning and extruding process.

Another object of the invention is to provide means for raising a frozen comestible containing vessel to and into operative engagement with an ice cream conditioning and extruding auger which moves the vessel at a relatively high rate of speed with relatively low power before the operative engagement and at a relatively lower rate of speed and higher application of power after the operative engagement.

Still another object of the invention is to provide a single means for actuating and then releasing a single switch for starting and stopping an ice cream conditioning and extruding auger as an ice cream containing vessel is moved relative thereto, the switch actuated before or immediately after the auger contacts the ice cream at a first position of the vessel, the switch released immediately when withdrawal of the vessel from the auger begins to take place at a second position of the vessel.

Another object of the invention is to provide single means for starting and stopping power for a mixer, the power being started when a vessel approaches the mixer at one position of the vessel and the power being stopped when the vessel is at a second position immediately after it begins withdraw from the mixer.

Another object of the invention is to provide means to permit an arm on a shaft to actuate a switch at one angular position of the shaft relative to the switch, continue actuation of the switch while the shaft moves to a second angular position relative the switch, release the switch when the shaft reverses its motion away from the second angular position and reposition the arm on the shaft to control movement of the arm in a repeated approach to the first angular position.

Yet another object of the invention is to provide a housing for a device for conditioning and extruding frozen comestibles which opens only when the comestible is to be extruded and which exposes a minimum of the interior mechanism of the device to the exterior view while yet processing the ice cream and extruding it in convenient, attractive fashion for reception by the operator.

Another object of the invention is to provide a device for conditioning and extruding frozen comestibles contained in a housing, the housing automatically opening upon actuation of the device at a proper time for the operator to receive the ice cream from the extruding means.

Still another object of the invention is to provide means associated with a device for conditioning and extruding originally hardened ice cream which permits the insertion of the ice cream within the device without manual contact by the operator with the ice cream.

Another object of the invention is to provide a completely housed device for conditioning and extruding frozen comestibles wherein the ice cream is contained in a protective package, the operator touching only the package and merely feeding the ice cream through an opening in the housing, means being provided within the housing for receiving the ice cream whereby to automatically strip the protective covering therefrom.

Other and further objects of the invention will appear in the course of the following description thereof.

In the drawings, which form a part of the instant invention and are to be read in conjunction therewith, an embodiment of the invention is shown and, in the various views, like numerals are employed to indicate like parts.

FIG. 3 is a view taken along the lines 3—3 of FIG. 2 in the direction of the arrows.

FIG. 5 is a rear three-quarter perspective view of the frozen comestible receiving hopper shown positioned relative to the door of the housing as it is before the operating cycle of the apparatus embodying the invention of the previous figures is commenced.

FIG. 8 is a three-quarter perspective view of a cylinder or roll of frozen comestible or ice cream which is wrapped in waxed paper and adapted for use in the instant inventive construction.

Figure 1:
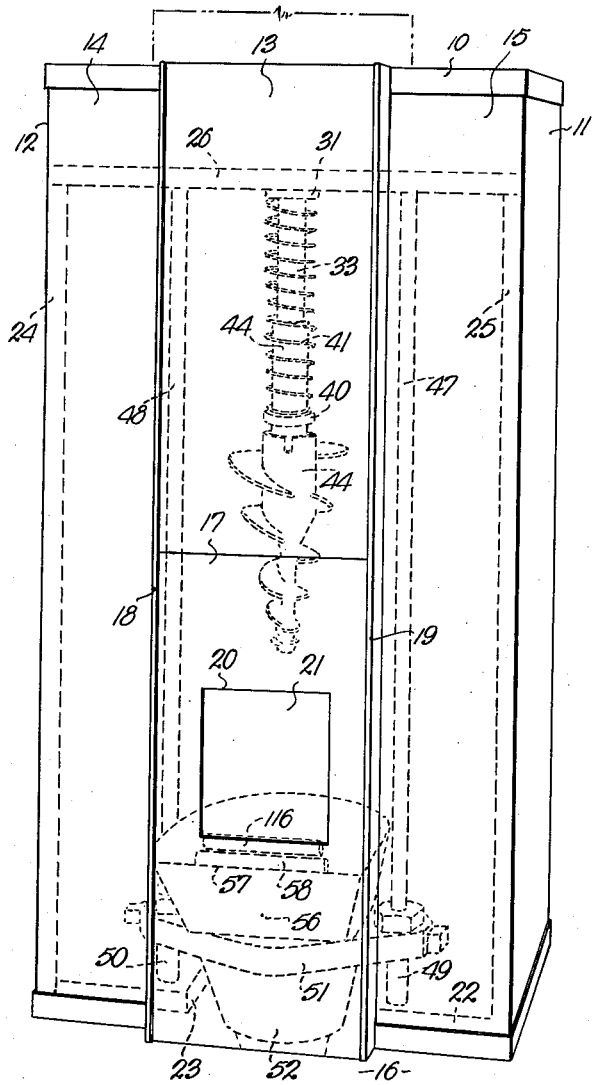
FIG. 1 is a perspective view from the front of a housing for an apparatus for processing frozen comestibles embodying the invention with the housing itself shown in full lines and portions of the apparatus therewithin shown in dotted lines.

Referring to FIG. 1, therein is shown a typical housing for the inventive apparatus having a top 10, side walls 11 and 12, a front outwardly stepped wall 13, recessed side front portions 14 and 15, and a supporting surface 16 upon which the housing rests. A vertically movable and slidable front door 17 fits within positioning tracks 18 and 19 and has opening 20 centrally thereof which receives hinged door 21 therebehind. The actual operating structure of the inventive device (particularly the lower portion of the frozen comestible receiving cup or hopper) extends below the supporting surface 16 as will be described.

Figures 2, 4:
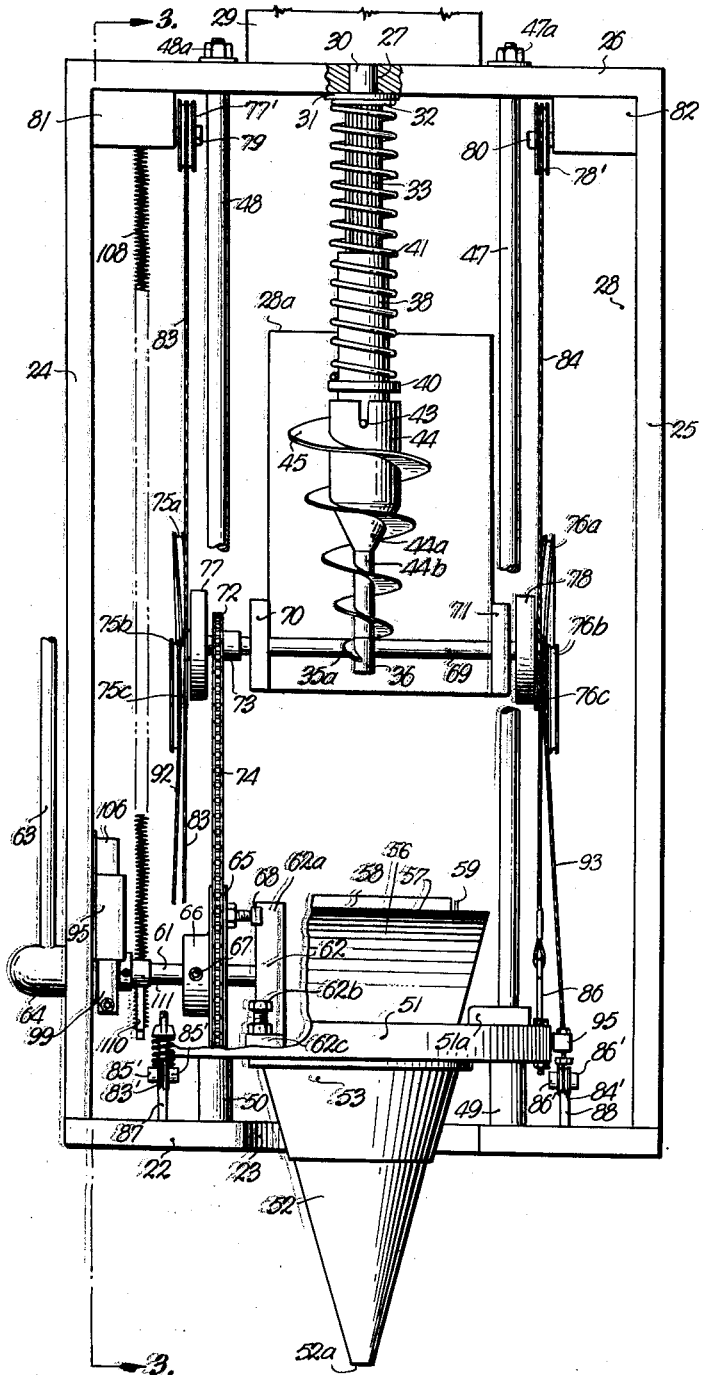
FIG. 2 is a front view of the internal operating apparatus of the device of FIG. 1 with parts cut away and broken away to better illustrate the operating structure.
FIG. 4 is a detailed partly sectional view of the agitating auger employed in the apparatus of FIGS. 2 and 3 with the telescoping portion of the auger fully retracted.

Referring, then, to FIGS. 2 and 3, therein is shown in detail the operating parts of the inventive frozen comestible processing device. A supporting frame within the previously described housing includes lower frame plate or bottom wall 22 having hollowed out portion 23 centrally of the front side thereof, upwardly-extending side walls or plates 24 and 25 which are fixed to the bottom wall or plate 22, and top wall or auger supporting plate 26 having an opening 27 centrally thereof extending therethrough. Rear wall or plate 28 is fixed to the top, side and bottom walls to form a rear enclosure for the inventive operating apparatus. Opening 28a is provided in wall 28 for access to the inside of the housing for minor repairs and replacements.

A conventional electrical or otherwise powered prime mover or power source 29 is mounted on the top plate 26 and drives in rotation shaft 30 extending through opening 27. Bearing or shim 31 spaces enlargement 32 on the shaft 30 below the top wall 26 for spaced rotation of the shaft 30 below said wall. The detailed structure of the agitating and plasticizing auger of the inventive device, as shown in FIG. 4, will now be described in detail.

*The Auger*

Shaft 30 below enlargement 32 is of a larger diameter than above it but lesser diameter than enlargement 32 itself and has male spline 33 on the outside surface thereof extending down to inwardly tapered portion 34. Tapered portion 34 has threaded opening 35 in the lower end thereof extending axially upward therein. Elongate shaft 36, cylindrical in form and threaded 37 at its upper end is engaged with the threaded opening 35 of the shaft 30 and extends downwardly and axially therefrom. An inner sleeve 38 fits over the enlarged portion of the shaft 30 and the male spline 33 and has inwardly-extending female spline members 39 to fixedly engage with the male spline members 33 in rotation of the shaft 30 but permit sliding movement of the first sleeve 38 on the male spline 33. A circumferential flange or shelf 40 is mounted on the outside surface of the sleeve 38 whereby to receive the lower end of resilient coil spring 41 whose upper end abuts the underside of bearing or shim 31. Openings 42 receive opposed positioning shafts 43 therein which are fixed to and extend outwardly past the outer surface of sleeve 38.

A secondary sleeve 44 fits over the lower outer surface of first sleeve 38 and has an auger flight 45 of upwardly increasing amplitude mounted on the external surface thereof. At its lower end, sleeve 44 is inwardly formed as at 44a to provide a tube 44b of slightly greater inner diameter than the outer diameter of shaft 36 whereby to slidably move on the latter. The auger flight 45 also runs the length of the lower sleeve portion 44b. Sleeve 44 has opposed slots 44c opening out of the upper end thereof to receive shafts 43 which, when positioned within said slots 44c act to key the sleeve 44 to rotation of sleeve 38 and the enlarged portion of the shaft 30. The auger flight 45 may be of uninterrupted or interrupted type as any of the types shown in my Patent No. 2,626,133. An uninterrupted flight is illustrated in the instant drawings but is not intended to be limiting. A spinner 46 of an outer diameter equivalent to the portion 44b of sleeve 44 is fixed to the lower end of rod or shaft 36 and has the lower portion 45a of the auger flight 45 mounted thereon.

FIGS. 2 and 4 show two opposed positions of the auger parts. In FIG. 2, with no force acting to push sleeve 44 (and therefore sleeve 38 connected thereto by shafts 43) upwardly, the spring 41 urges the entire assembly down so that the lower end of tube 44b abuts the upper end of spinner 46, with the sleeve 38 positioned at a maximum distance from the enlargement 32 on shaft 30. The length of the shaft 36, spline 33, sleeve 38 and tube 44b must be proportioned that the upper end of the female spline 39 engages at all times the lower end of the male spline 33 when the sleeve 44 is contacting spinner 46. In FIG. 4, force acting upon the sleeve 44 through the auger 45 has forced sleeve 44 upwardly against the tension of spring 41 (and sleeve 38 therewith) to where the lower end of the enlarged portion of shaft 30 at 34 abuts the lower end of the cavity of sleeve 44. The purpose of this telescoping auger structure will be later described.

*The Hopper and Its Transfer Mechanisms*

Figure 6:
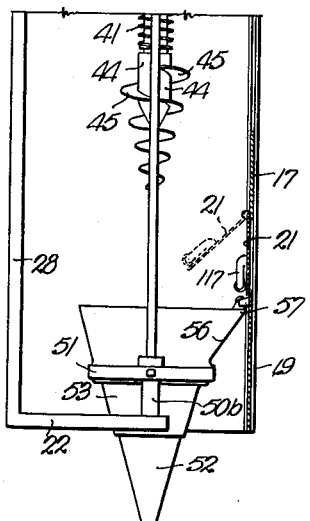
FIG. 6 is a side schematic view of portions of the inventive apparatus at a stage before the operating cycle is commenced with the frozen comestible input door of the housing shown in full lines in closed position and in dotted lines in open position.

A hopped is provided for receiving frozen comestible or ice cream therein to be plasticized by action of the auger previously described. A pair of vertical cylindrical rods 47 and 48 are fixed between the top wall 26 and bottom wall 22 of the frame by nuts 47a and 48a fixed to the upper threaded portions of rods 47 and 48 extending through openings (not shown) in the top plate 26. The lower ends of rods 47 and 48 are fixed to the bottom plate 22. Sleeves 49 and 50 slidably encircle rods 47 and 48 and are fixed at their upper ends to a saddle 51. Saddle 51 has an enlarged opening centrally thereof to receive the hopper to be described and has bearings 51a and 51b mounted on the top sides of the side arms of the saddle through which rods 47 and 48 extend. The lower portion of the hopper comprises a downwardly-extending smooth inside cone 52 which tapers to a relatively restricted lower opening 52a. A flange or secondary cup 53 is fixed to the underside of the saddle 51 and removably receives the integral hopper or cup portion 52. The upper part of the hopper comprises, in the rear side 54 thereof, an upward extension of the lower conical portion 52 and, in the front side thereof, an outwardly-extending trough 55 which has a flat front face 56 angled forwardly with an upper edge 57 which lies substantially against and closely in proximity to the rear side of the sliding door 17 as seen in FIGS. 5 and 6. An enlarged flange 52a overlies saddle 51 to vertically position the hopper therein. A roller 58 is mounted on arms 59 in rotatable fashion, the latter being attached by flanges 60 to the inner face of the front wall 56 of the trough 55. The roller 58 extends slightly above the upper edge 57 of the front wall 56 of the trough 55.

A primary shaft 61 has one end thereof rotatably received in bearing block 62, with the other end thereof extending through an opening (not shown) in side wall 24. An operating handle 63 is fixedly mounted through hub 64 on the outer end of shaft 61 and operates to rotate shaft 61 about its axis. Sprocket 65 has its hub 66 fixedly attached to the shaft 61 by set screw 67. Stop screw 68 mounted on the other side of sprocket 65 is limited in its movement in one direction by the upper portion of the face 62a of bearing block 62 and in the other direction by adjustable stop screw 62b mounted on shelf 62c of bearing block 62.

Secondary shaft 69 is rotatbly received in bearing blocks 70 and 71 mounted on rear wall 28. Sprocket 72 mounted on hub 73 is fixedly mounted on the shaft 69 to rotate therewith and chain 74 on sprocket 72 communicates with and is driven by lower sprocket 65 on shaft 61. Drums 75 and 76 mounted on hubs 77 and 78 are fixed to the opposite ends of shafts 69 outside of bearing blocks 70 and 71, whereby to rotate with shaft 69. Drums 75 and 76 are of varying radius in that the circumferential groove 75a and 76a on the drum 75 and 76, respectively, runs from an inner least radius point 75b to 76b to an outer greatest radius point 75c and 76c to an outer greatest radius point 75c and 76c, the former laterally displaced from the latter.

A pair of upper pulleys 77' and 78' are rotatably mounted on shafts 79 and 80 received in supporting blocks 81 and 82 fixed to the upper plate 26 of the frame. Cables 83 and 84 lead from eye-bolts 85 and 86 secured to the outer upper surfaces of saddle 51 over the pulleys 77 and 78 and down to connections on the drums 75 and 76 at the greatest radius points of the drum. One such connection 75d is shown in FIG. 3.

A pair of lower pulleys 83' and 84' of relatively small diameter are mounted on shafts received between paired arms 85' and 86' pivotally mounted on vertical mounting arms 87 and 88 on each side outward of the vertical rods 47 and 48. Means are provided for resiliently biasing the arms 85' and 86' whereby to continuously urge the pulley 83' and 84' toward the bottom plate 22 as shown in FIG. 3. Thus, shaft 89 extends between the paired arms 85 and has resilient coil spring 90 compressed between wing nut 91 threaded on the upper end of shaft 89 and the upper portions of arms 85. Cables 92 and 93 extend from outer connection blocks 94 and 95 on saddle 51 down around pulleys 83' and 84', up into the grooves 75a and 76a, and around the drums 75 and 76 to connections at the inner radius points of the drums, one of which is shown at 75f in FIG. 3.

In the operation of the cable and drum system immediately previously described, starting from the position of FIGS. 1, 2, 3 and 6, with the hopper at its lower beginning point and with cables 83 and 84 payed out completely from the drums 75 and 76, operation is begun by the operator grasping lever 63 and pulling it toward the viewer in FIG. 2. This would move shaft 61 clockwise in FIG. 3, thus rotating sprocket 65 in the same direction and, also, sprocket 72 and thus shaft 69 in a clockwise direction. Rotation of shaft 69 in a clockwise direction rotates drums 75 and 76 in like direction, thus tending to wind up the cables 83 and 84 into the grooves 75a and 76a on the drums 75 and 76. As the drums move in a clockwise direction in FIG. 3, cables 83 and 84 are thereby found up on the geatest radius portions of the drums moving toward the lesser radius portions, while cables 92 and 93 are paid out from the greater radius portion of the drum first, then working toward the lesser radius portion. In other words, cables 83 and 84 are wound up on the drums at a progessively decreasing rate, and the cables 92 and 93 are unwound at a progressively decreasing rate. The spring mounting of arms 85 and 86 tends to keep the cables 92 and 93 taut at all times. Thus the hopper is raised at an initially relatively great rate with relatively lesser power which changes to a relatively lesser rate with progressively increasing power. The reverse sequence finds a withdrawal of the hopper beginning with greater power and less speed and ending with the opposite. The cable adjustment, sprocket size adjustment, and permitted arc of rotation of shaft 61 must be so adjusted as to be able to move the hopper from the position of FIG. 6 to the position of FIG. 7 with the auger periphery substantially in contact with the cup inside wall at the end of the stroke of the lever 63.

*The Power Control*

Means are provided to switch on the motor 29 driving the auger before the auger contacts any frozen comestible in the hopper 52. Means are also provided for switching off the motor 29 as soon as or shortly after the hopper commences to withdraw from the auger after the frozen comestible has been processed and extruded from the hopper. Referring particularly to FIG. 3, therein is shown means whereby a single switch may be so actuated as to accomplish both goals.

Microswitch 95 is fixed to plate 96 which is, in turn, fixed to the side wall 24 by screws 97. Switch 96 has activating lever 98 which is spring mounted for both actuation and deactuation of the switch. Actuating arm 99 is frictionally mounted on shaft 61 by means of spring-loaded plate 100 to which are attached shafts 101 and 102 carrying resilient coil springs 103 and 104 which tend to urge the arm 99 and plate 100 together thus to grip shaft 61 therebetween. An adjustable stop 105 is mounted on block 106 which is fixed by screws 107 to the side wall 24.

In the beginning position of FIGS. 1, 2, 3 and 6, the arm 99 is in abutment with the stop 105. Actuation of arm 63 toward the viewer in FIG. 2 rotates shaft 61 in FIG. 3 in clockwise direction, thus bringing arm 99 in an arc against the activating lever 98. Continued actuation of operating arm 63, however, tends to rotate shaft 61 past the position where arm 99 strikes actuating arm 98. The frictional mounting of arm 99 on shaft 61 permits arm 99 to slip around the shaft, while still contacting and activating lever 98. Thus, as long as the arm 63 is retained in the forward position, microswitch 95 is actuated and motor 29 spins the auger. Once, however, the operator returns the arm 63 or permits the arm 63 to move away from the viewer in FIG. 2 and rotating shaft 61 in a counterclockwise direction in FIG. 3, arm 99 immediately moves away from activating lever 98 of switch 95, thus shutting off the motor and auger. Continued movement of arm 63 continues to rotate shaft 61 in a counterclockwise direction until arm 99 abuts stop 105. Yet further movement of arm 63 back to its original position (returning the hopper 52 to the position of FIG. 3) causes arm 99 to again slip on shaft 61 and remain in the position shown in FIG. 3. By providing the frictional mounting, slippage of the arm 99 is obtained in both directions in rotation of shaft 61 and the desired objects are achieved.

A resilient coil spring 108, attached to an eye 109 on upper plate 26 and at its lower end to an arm 110 fixedly mounted on shaft 61 by hub 111, tends to rotate shaft 61 in a clockwise direction in FIG. 3 and thus tends to raise the hopper 52. Spring 108 tends to counterbalance the weight of the hopper and saddle in combination whereby to minimize the effort required by the operator to actuate the arm 63. The strength of the spring 108 is regulated so as not to maintain the hopper in the upper position of FIG. 7, but permit it to return to the bottom position of FIGS. 2 and 3 when the operator releases the arm. However, if the operator happens to let the lever slip from his grasp, the spring 108 prevents serious jarring and damage to the device by the falling of the hopper and saddle to the lower position.

Charging the Frozen Comestible

It is desirable that the operator not contact the frozen comestible to be processed with his hands. For this reason, a special packing of the frozen comestible to be processed is employed, as shown in FIG. 8. Therein is shown a cylindrical body 112 of frozen comestible wrapped in an encircling sheet 113 of waxed paper or the like. The end of the sheet 113 of waxed paper overlaps upon itself, is attached thereto and provides extending tab 114. The ends of the cylinder may or may not be open. A variation of this form of ice cream body is contemplated wherein the body itself is substantially cone-shaped or frusto-conical in shape with a frusto-conical or conical wrap of waxed paper or protective paper of some sort also with the overlapping tab.

Figure 7:
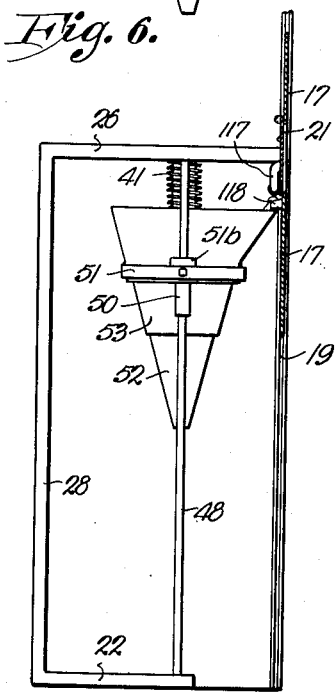
FIG. 7 is a view similar to that of FIG. 6 but with the ice cream or frozen comestible receiving hopper positioned at its upward extreme position when the ice cream has been at least substantially extruded from the hopper.

Referring to FIGS. 5, 6 and 7, hinged door 21, which is mounted on rod 115 fixed to sliding door 17, has roller 116 rotatably mounted on arms 117 which are fixed to the inside surface of door 21. As may be seen in FIGS. 5 and 6, rollers 116 and 58 are closely positioned relative to one another when the hopper is in its lower or base position at the start of the operating cycle. FIG. 6 shows the manner in which the hinged door may be pivoted inwardly to permit the insertion of the cylinder or roll of frozen comestible or ice cream behind the door 17. The operator grasps the flap 114 on the roll of ice cream, inserts the roll into the door 21 and permits the hinged door 21 to fall closed upon the cylinder. By then merely pulling on the tab 114, the operator strips the waxed paper from the ice cream or frozen comestible which falls onto the slanted face 56 of the front of the trough 55 and from thence into the conical lower hopper 52. The smallest diameter of the ice cream body 112 is preferably substantially greater than the least diameter of the lower portion of the hopper 52. Once the frozen comestible has been placed in the hopper, the door 17 remaining closed and the hinged door 21 being closed, the operator may insert any other substance or substances such as flavors, nuts, or other such additives to improve or transform the desired resultant processed comestible, through the hinged door. Once this is done, the lever 63 may be activated to raise the hopper from the position of FIG. 6 to that of FIG. 7 to process the ice cream or frozen comestible.

In my Patent 2,626,133, I described and disclosed means cooperating between the top of the auger and the base of the hopper which provided a pulsating outlet for the frozen comestible being processed in the hopper. It is my intention that this construction, which involves a centering tip on the auger, a cap on the bottom of the cup or hopper having an opening adapted to receive the centering tip and three circumferentially spaced orifices around the opening through which the material is extruded, be employed with the instant construction. On the bottom of the auger, as described in the Patent 2,626,133 but not here shown, is a flattened surface which rides flush against the inside of the cap when the cup is elevated serving as a valve to close the orifices in succession as the auger turns. As all of this structure has been previously described in detail in my Patent 2,626,133, I do not redescribe it in full detail or illustrate it in this application but merely incorporate it by reference herein.

Also referring to FIGS. 5, 6 and 7, a pair of inwardly-extending ears or flanges 118 and 119 are attached to the inner surface of door 17 overlying the outwardly-extending face 56 of the cup or hopper. As may be seen in FIGS. 5–7, inclusive, upward movement of the hopper from the bottom position of FIG. 6 to the upper position of FIG. 7 causes the upper front edge 57 of the hopper or cup to engage the ears 118 and 119 whereby to carry the sliding door 17 upward in its track to the position of FIG. 7. The lower edge 17a of the sliding door 17 thus constantly remains at its spaced relationship to the bottom of the hopper whereby the lower end of the hopper extends below the lower end of the door 17a at all times. Thus, when the door 17 is at its uppermost position of FIG. 7, the operator can extend his hand into the housing under the tip of the hopper to receive the extruding frozen confection from the bottom thereof in a suitable container. Then, by manipulation of the operating handle 63, the hopper and the door 17 can be returned to the position of FIGS. 6 and 1.

One of the chief objects of the invention is to avoid the extrusion of a slug of hard, unmixed, unprocessed comestible from the cup or hopper before the entire body of ice cream therein is fully mixed and processed. The particular construction of the auger is designed to minimize such undesirable extrusion. As the operator actuates arm 63 to move the hopper upwardly as previously described, the auger commences operation as microswitch 95 is actuated. Thus the auger is rotating before any portion thereof contacts the comestible in the hopper. However, the hopper continues to move upwardly and the auger contacts it with the tip thereof. The spinner tip 46 carries a portion of the auger flight 45a of relatively minor area. Thus the spinner tip enters the ice cream with a minimum of effort, despite its hardness and resistance and with a minimum of tendency to force ice cream out of the lower opening of the hopper. However, as the auger moves further into the hopper and material therein as the hopper continues to rise, a greater resistance is encountered by the auger as the greater area of the auger flight moves thereinto. It is this stage which offers the greatest problem of early extrusion. Because of slidable sleeves 38 and 44 on the shaft 36 and the male spline portion 33 of the shaft 30, this resistance causes the sleeves to move upwardly against the resistance of spring 41, while the spinner tip 46 continues to move downwardly within the body of the comestible or ice cream agitating as it moves.

It is possible for the spinner tip to reach the bottom of the hopper while the upper and major portion of the auger flight remains close to the top of the hopper. While there is pressure being exerted on the comestible in the hopper to extrude it due to spring 41, such comestible must pass spinner 46 and auger flight 45a so that any of it extruded through the openings is, at least, whipped and processed to a certain minimum degree. Additionally, spring 41 gradually forces the auger flight further and further into the mass of comestible, churning and plasticizing it according to the invention whereby, finally, the sleeve 44b abuts the spinner tip 46 and the extrusion of the completely plasticized and processed comestible proceeds in the desired fashion. Thus the extrusion of unprocessed, unmixed and unplasticized comestible or ice cream is minimized, while the plasticizing and extrusion is ultimately accomplished in the optimum fashion.

As the operator permits the handle 63 to return to its original position from the forward position of FIG. 7, the hopper moves only slowly away from the auger, due to the configuration of drums 75 and 76 at first and, then, once the auger has cleared the hopper, the motion is quicker.

The dimensions of the auger relative the hopper or cup are substantially the same as in Patent 2,626,133 whereby to provide good engagement between the margin of the auger and the cup when the auger is completely assembled. The physical action of the auger in its various forms in the cup processing the frozen comestible is substantially the same as in Patent 2,626,133, save for the action previously described involving the separation of the portions of the auger flight and their ultimate reconnection. Again, the hypothesized action of the auger on the comestible or ice cream is identical to that set forth in Patent 2,626,133 and also will not be again repeated. Additives may be employed as in Patent 2,626,133. The speed of the auger and its range, as well as the back pressure pulsations provided by the opening and closing of the openings in the cap at the bottom of the cup are as set forth in Patent 2,626,133 and will not be again repeated. Again, in the case of the augers employed, by virtue of their engagement with the interior of the cup, they wipe the cup almost dry, leaving it so clean after it is used that it may be reused immediately with other flavors without any "carry over" of the flavor from one operation to the next.

From the foregoing it will be seen that this invention is one well adapted to attain all of the ends and objects hereinbefore set forth, together with other advantages which are obvious and which are inherent to my method and apparatus.

It will be understood that certain features and subcombinations are of utility and may be employed without reference to other features and subcombinations. This is contemplated by and is within the scope of the claims.

Inasmuch as many possible embodiments may be made of the invention without departing from the scope thereof, it is to be understood that all matter hereinabove set forth or shown in the accompanying drawings is to be interpreted as illustrative and not in a limiting sense.

Having thus described my invention, I claim:

1. An auger for conditioning and extruding frozen comestibles comprising an auger shaft, means supporting said auger shaft with its axis upright and a free end thereof down, a spinner tip of greater outer diameter than the diameter of the shaft next thereto fixed to the lower end of the shaft, a tube mounted circumferentially to said shaft and vertically slidable thereon between the spinner and an upper limit on said shaft, means fixing said tube to said shaft for rotation therewith but not thereon between said tube positions, an auger flight of upwardly increasing amplitude fixed to the outer surface of said tube, and means tending to maintain the lower end of the tube adjacent said spinner and resist vertical motion of the former.

2. In combination, an open top hopper having circular downwardly extending side walls communicating with a restricted opening in the bottom of the hopper, an auger shaft, means supporting said auger shaft with its axis upright and its free end down, means supporting said hopper below the auger in axial alignment therewith, a spinner tip of greater outer diameter than the diameter of the shaft next thereto fixed to the lower end of said shaft, mechanism connected to one of said support means for moving same toward the other support means to introduce said auger shaft into said hopper, a tube mounted circumferentially to said shaft and vertically slidable thereon between the spinner and an upper limit on said shaft, means fixing said tube to said shaft for rotation therewith but not thereon between said two positions, an auger flight of upwardly increasing amplitude fixed to the outer surface of said tube, and means tending to maintain the lower end of the tube adjacent said spinner and resist vertical motion of the former.

3. In an auger for conditioning and extruding frozen comestibles, an elongate shaft, a spinner tip fixedly adjacent the lower end of said shaft, a male spline on an upper portion of said shaft and spaced upwardly from said spinner tip, a hollow tube encircling the portion of said shaft between said spinner and spline and vertically movable therebetween, a female extension of said tube overlying at least a portion of said male spline independent of the vertical position of the tube on the shaft between the spinner and male spline, spline means connected to said female extension cooperating with said male spline to prevent rotation of said female extension on said shaft, at least one auger flight of increased amplitude in its upper portion on one of the tube and the female extension, and means continuously tending to move the female extension and tube toward the spinner tip.

4. Apparatus as in claim 3 wherein the means tending to move the female extension and tube comprises a coil spring encircling the male spline and abutting shelves on the shaft and female extension.

5. In an auger for conditoning and extruding frozen comestibles, an elongate shaft, a spinner tip fixedly attached adjacent the lower end of said shaft, a male spline on an upper portion of said shaft and spaced upwardly from said spinner, a hollow tube encircling the portion of said shaft between said spinner and spline and movable vertically therebetween, at least one auger flight of decreasing amplitude downwardly on said tube, female means connected to said hollow tube overlying at least a portion of said male spline at all vertical positions of the tube on the shaft between the spinner and the male spline, spline means on said female means cooperating with said male spline to prevent rotation of said female means on said shaft, and means continuously tending to move the female means and tube toward the spinner.

6. In an auger for conditioning and extruding frozen comestibles, an elongate shaft, a spinner tip fixedly attached adjacent the lower end of said shaft, an extreme portion of an auger flight fixed to the outside portion of said spinner, a male spline on an upper portion of said shaft and spaced upwardly from said spinner, a first hollow tube encircling the portion of said shaft between said spinner and spline and vertically movable therebetween, at least one auger flight of decreasing amplitude downwardly on said tube, a female tube member above said first tube adapted to slide up and down on said spline, spline means internal of said female tube to couple it with the male spline, means coupling the first tube member and female tube member together, and means tending to move the female tube toward the spinner.

7. Switch means comprising a shaft mounted to rotate around its longitudinal axis, means attached to said shaft to rotate it in either direction around its longitudinal axis, a switch positioned adjacent to said shaft, said switch having means thereon which, when contacted, activates the switch and, which when free from contact deactivates the switch, an actuating arm frictionally mounted on said shaft to move therewith in rotation of the shaft but slip thereon when its travel is obstructed in either direction of rotation of the shaft, said arm so positioned on said shaft and of such form as to contact said switch activating means on rotation with the shaft in one direction and clear said activating means on rotation in the other direction, a first stop for the actuating arm positioned adjacent to said shaft and spaced from said switch, said arm positioned between said switch and said first stop.

8. Switch means as in claim 7 including a second stop for the shaft positioned angularly past the switch in the direction of rotation of the shaft that carries the arm to the switch.

9. Switch means as in claim 7 including another stop for the shaft positioned angularly past the first stop in the direction of rotation of the shaft that carries the arm to the first stop.

10. Switch means as in claim 7 including a second stop for the shaft positioned angularly past the switch in the direction of rotation of the shaft that carries the arm to the switch and a third stop for the shaft positioned angularly past the first stop in the direction of rotation of the shaft that carries the arm to the first stop.

11. Apparatus of the character described comprising a pair of at least substantially vertically mounted parallel rods, a saddle slidably mounted on said rods, a shaft rotatably mounted in substantially horizontal orientation in a plane at least substantially parallel to the plane through the vertical axes of the rods, a pair of circumferentially grooved drums of varying radius fixed to said horizontal shaft one adjacent each vertical rod, first cable guide means rotatably mounted above each drum, second cable guide means rotatably mounted below each drum, a first cable means connected to the greater radius portion of each of said drums running in the grooved portion thereof and extending over the cable guide means thereabove and connected to said saddle adjacent the respective drum, whereby rotation of the horizontal shaft in one direction will raise the saddle upwardly at a progressively decreasing rate with progressively increasing power, a second cable means connected to the lesser radius portion of each of said drums running in the grooved portion thereof and extending around the cable guide means therebelow, and connected to the saddle adjacent the respective drum, whereby to draw the saddle downwardly on rotation of the horizontal shaft in the opposite direction in a manner opposite to the manner of raising said saddle.

12. Apparatus as in claim 11 including means connected to the horizontal shaft to manually control the rotation in each direction.

13. Apparatus as in claim 11 wherein the cable guide means are pulleys.

14. Apparatus as in claim 11 wherein means are provided for maintaining said lower cables continuously in taut condition.

15. Apparatus as in claim 14 wherein the means for maintaining the lower cables taut comprises pivotally mounting the lower cable guide means with resilient means associated therewith urging the cable guide means away from the drums.

16. Apparatus as in claim 11 including means limiting the rotation of the horizontal shaft in each direction.

17. In a frozen comestible processing device, an enclosing housing for said processing device, a hopper for receiving frozen comestibles for processing and extrusion therefrom positioned within said housing, a hinged door into said housing operable to swing open under external force and close when said force is removed, said hopper and hinged door when the former is ready to receive a charge of frozen comestibles relatively positioned so that the door lower edge swings inwardly over the hopper upper edge closely positioned relative thereto, an outer lip of said hopper extending under and parallel to said door lower edge and closely adjacent thereto when the door is closed and the hopper is ready to receive the comestible, a first roller means mounted on said hopper outer lip inwardly of said hopper and substantially parallel to said lip and a second roller means mounted on said door lower edge inwardly of the door and parallel to said edge.

18. Apparatus as in claim 17 including a roller mounted on said first arm.

19. Apparatus as in claim 17 including a roller mounted on said second arm.

20. Apparatus as in claim 17 including a roller mounted on each of said first and second arms.

21. In a frozen comestible processing device, an enclosing housing for said frozen comestible device having an opening therein, a vertically sliding door in said housing which closes said opening in its own closed position, a vertically movable hopper in said housing adapted to receive a charge of frozen comestible at a first lower point and move upwardly to a second limiting position, means in the housing to enter said hopper in its upward motion to process and extrude the comestible in and from the hopper, means for raising and lowering said hopper within said housing, and means on said sliding door adapted to engage a portion of the hopper whereby to be raised and lowered therewith.

22. Apparatus as in claim 21 wherein the engaging means on the sliding door are so positioned thereon that only the lower portion of the hopper is exposed below the door when the hopper and door are in engagement.

23. In a frozen comestible processing device an enclosing housing for said processing device, a vertically movable hopper for receiving frozen comestibles for processing and extrusion therefrom positioned within said housing, said housing having an opening therein, a vertically slidable door in said housing which closes said opening in a lower position thereof and opens it in an upper position thereof, said hopper adapted to receive a charge of frozen comestible at a first lower position and move upwardly to a second limiting position, a hinged door into said housing on said vertically slidable door operable to swing open under external force and close when said force is removed, said hopper and hinged door, when the former is ready to receive a charge of frozen comestibles and the vertically slidable door is at its lower position, so relatively positioned that the door lower edge swings inwardly over the hopper upper edge closely positioned relative thereto, an outer lip of said hopper extending under and parallel to said hinged door lower edge and closely adjacent thereto when the door is closed and the hopper is ready to receive the comestible, means in said housing to enter said hopper in its upward motion to process and extrude the comestible in and from the hopper, means for raising and lowering said hopper within said housing, and means on said sliding door adapted to engage a portion of the hopper whereby to be raised and lowered therewith.

24. Apparatus as in claim 23 including a first roller means mounted on said hopper outer lip inwardly of said hopper and substantially parallel to said lip, and a second roller means mounted on said hinged door lower edge inwardly of the door and parallel to said edge.

25. In a frozen comestible processing device, a pair of at least substantially vertically mounted rods, a saddle slidably mounted on said rods, a first shaft rotatably mounted in substantially horizontal orientation in a plane at least substantially parallel to the plane through the vertical axes of the rods, a pair of circumferentially grooved drums of varying radius fixed to said horizontal first shaft one adjacent each vertical rod, first cable guide means rotatably mounted above each drum, second cable guide means rotatably mounted below each drum, a first cable means connected to the greater radius portion of each of said drums running in the grooved portion thereof and extending over the cable guide means thereabove and connected to said saddle adjacent the respective drum, whereby rotation of the horizontal shaft in one direction will raise the saddle upwardly at a progressively decreasing rate with progressively increasing power, a second cable means connected to the lesser radius portion of each of said drums running in the grooved portion thereof and extending around the cable guide means therebelow, and connected to the saddle adjacent the respective drum, whereby to draw the saddle downwardly on rotation of the horizontal shaft in the opposite direction in a manner opposite to the manner of raising said saddle, a second shaft mounted to rotate around its longitudinal axis, means attached to said shaft to rotate it in either direction around its longitudinal axis, means connecting said first and second shafts whereby rotation of one of said shafts in one direction will rotate the other shaft in one direction and rotation of the second shaft in the other direction will rotate the first shaft in a direction opposite to its first direction of rotation, a switch positioned adjacent to one of said shafts, said switch having means thereon which, when contacted, activates the switch and, which when free from contact deactivates the switch, an actuating arm frictionally mounted on said latter shaft to move therewith in rotation of the shaft but slip thereon when its travel is obstructed in either direction of rotation of the shaft, said arm so positioned on said shaft and of such form as to contact said switch activating means on rotation with the said shaft in one direction and clear said activating means on rotation in the other direction, a first stop for the actuating arm positioned adjacent to said shaft and spaced from said switch, said arm positioned between said switch and said first stop.

26. Apparatus as in claim 25 wherein the arm is mounted on said second shaft and the switch and stop are positioned adjacent thereto.

27. Apparatus for processing and extruding frozen comestibles comprising a pair of at least substantially vertically mounted parallel rods, a saddle slidably mounted on said rods, a shaft rotatably mounted in substantially horizontal orientation and in a plane at least substantially parallel to the plane defined by the vertical axes of the rods, a pair of circumferentially grooved drums of varying radius fixed to said horizontal shaft one adjacent each vertical rod, first cable guide means rotatably mounted above each drum, second cable guide means rotatably mounted below each drum, a first cable means connected to the greater radius portion of each of said drums running in the grooved portion thereof and extending over the cable guide means thereabove and connected to said saddle adjacent the respective drum, whereby rotation of the horizontal shaft in one direction will raise the saddle upwardly at a progressively decreasing rate with progressively increasing power, a second cable means connected to the lesser radius portion of each of said drums running in the grooved portion thereof and extending around the cable guide means therebelow, and connected to the saddle adjacent the respective drum, whereby to draw the saddle downwardly on rotation of the horizontal shaft in the opposite direction in the manner opposite to the manner of raising said saddle, an open top hopper having circular downwardly extending side walls communicating with a restricted opening in the bottom of the hopper mounted in and carried by said saddle, an auger shaft, means supporting said auger shaft with its axis upright and its free end down, said saddle supporting said hopper below the auger in axial alignment therewith, a spinner tip of greater outer diameter than the diameter next thereto fixed to the lower end of said shaft, a tube mounted circumferentially to said shaft and vertically slidable thereon between the spinner and an upper limit on said shaft, means fixing said tube to said shaft for rotation therewith but not thereon between said two positions, an auger flight of upwardly increasing amplitude fixed to the outer surface of said tube, and means tending to maintain the lower end of the tube adjacent said spinner and resist vertical motion of the former.

References Cited in the file of this patent
UNITED STATES PATENTS

| | | |
|---|---|---|
| 1,050,726 | Fales | Jan. 14, 1913 |
| 2,178,122 | Ostler et al. | Oct. 31, 1939 |
| 2,181,829 | Jeffrey | Nov. 28, 1939 |
| 2,626,132 | Reed | Jan. 20, 1953 |
| 2,626,133 | Reed | Jan. 20, 1953 |
| 2,692,124 | Mendoza | Oct. 19, 1954 |
| 2,704,360 | Werstein | Mar. 15, 1955 |